(12) United States Patent
Kester

(10) Patent No.: US 11,780,076 B2
(45) Date of Patent: Oct. 10, 2023

(54) GRASPING TOOL

(71) Applicant: Wolfe Electric, Inc., Wichita, KS (US)

(72) Inventor: Dale Kester, Wichita, KS (US)

(73) Assignee: WOLFE ELECTRIC, INC., Wichita, KS (US)

( * ) Notice: Subject to any disclaimer, the term of this patent is extended or adjusted under 35 U.S.C. 154(b) by 145 days.

(21) Appl. No.: 17/375,833

(22) Filed: Jul. 14, 2021

(65) Prior Publication Data
US 2021/0339379 A1    Nov. 4, 2021

(51) Int. Cl.
*B25J 1/04*    (2006.01)

(52) U.S. Cl.
CPC .................................... *B25J 1/04* (2013.01)

(58) Field of Classification Search
CPC .............. B25J 1/04; A47J 45/10; A21B 3/003
USPC .............. 294/31.1, 34, 6, 8, 9, 209
See application file for complete search history.

(56) References Cited

U.S. PATENT DOCUMENTS

| | | | |
|---|---|---|---|
| 818,869 A * | 4/1906 | Calvert | |
| 2,002,149 A * | 5/1935 | Kneeland | A47J 45/10 294/34 |
| 2,092,198 A * | 9/1937 | Anderson | A47J 45/10 294/34 |
| 2,140,165 A * | 12/1938 | Plitt | A47J 45/10 294/34 |
| 2,333,564 A | 11/1943 | Hargrave | |
| 2,450,193 A * | 9/1948 | Galliano | A47J 45/10 294/27.1 |
| 3,146,015 A * | 8/1964 | Roberge | B25J 1/04 294/104 |
| 3,265,429 A * | 8/1966 | Shatt | B25J 1/04 294/104 |
| 3,844,599 A | 10/1974 | Burian | |
| 3,918,757 A * | 11/1975 | Huber | A01B 1/18 294/50.9 |
| 3,976,204 A | 8/1976 | Dawson | |
| 4,039,216 A * | 8/1977 | Soos | B25J 1/04 294/100 |
| 4,260,186 A | 4/1981 | Sky-Eagle, Jr. | |
| 4,753,472 A | 6/1988 | Fout | |

(Continued)

FOREIGN PATENT DOCUMENTS

| | | |
|---|---|---|
| CN | 2933741 | 8/2007 |
| CN | 209256909 | 8/2019 |

(Continued)

*Primary Examiner* — Dean J Kramer
(74) *Attorney, Agent, or Firm* — Kenneth H. Jack; Davis & Jack, L.L.C.

(57) ABSTRACT

A tool for holding an article, the tool incorporating a first tube having proximal and distal ends; a cylindrical member received within the first tube, the cylindrical member having proximal and distal ends; a first pair of jaws, wherein one of the jaws among the first pair of jaws is fixedly attached to or formed wholly with the distal end of the first tube, and wherein the other jaw among the first pair of jaws is fixedly attached to or formed wholly with the distal end of the cylindrical member; and a second pair of jaws, wherein a first jaw among the second pair of jaws is fixedly attached to or formed wholly with the distal end of the first tube, and wherein the other jaw among the second pair of jaws is fixedly attached to or formed wholly with the distal end of the cylindrical member.

13 Claims, 4 Drawing Sheets

(56) References Cited

U.S. PATENT DOCUMENTS

| | | |
|---|---|---|
| 4,938,516 A | 7/1990 | Temple |
| 5,104,166 A | 4/1992 | Corsaro et al. |
| 5,417,463 A | 5/1995 | DiPaola |
| 5,634,679 A | 6/1997 | Hilderbrandt |
| 6,193,289 B1 | 2/2001 | Brown |
| 6,530,611 B2 | 3/2003 | Moreth |
| 8,672,373 B1 | 3/2014 | Hartman |
| D718,095 S | 11/2014 | Sullivan, Jr. et al. |

FOREIGN PATENT DOCUMENTS

| | | |
|---|---|---|
| GB | 183045 | 7/1922 |
| WO | WO2006/051139 | 5/2006 |
| WO | WO2007/032614 | 3/2007 |
| WO | WO2010/098536 | 9/2010 |
| WO | WO2020/197581 | 10/2020 |

* cited by examiner

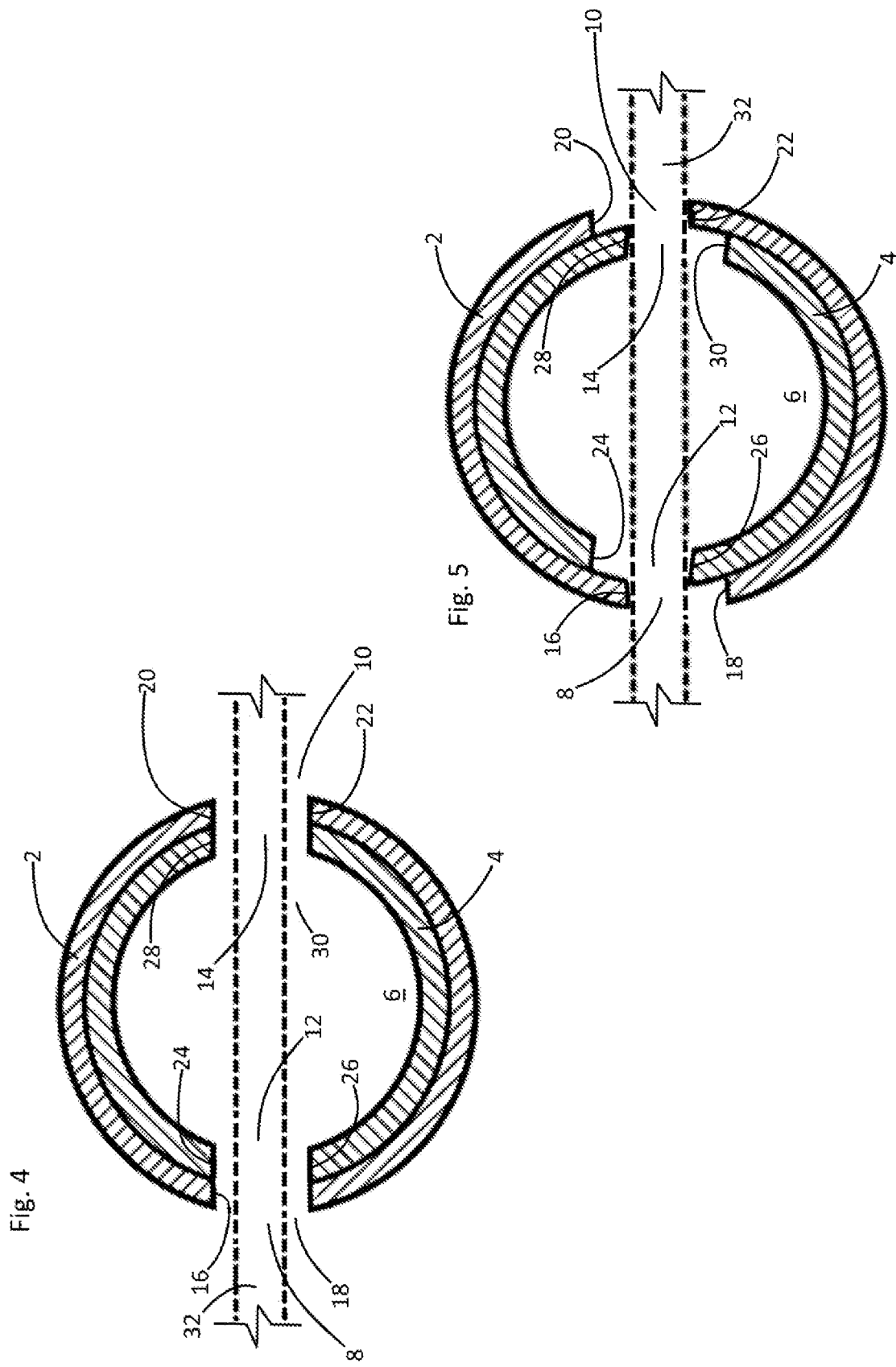

GRASPING TOOL

FIELD OF THE INVENTION

This invention relates to hand held and hand grip actuated tools for holding and grasping articles such as sheet metal panels or plates.

BACKGROUND OF THE INVENTION

Hand grip actuatable grasping tools are known, such tools commonly presenting calipers or clamping jaws at the distal end of an extension arm. Such tools are commonly incapable of firmly and securely grasping and holding an edge of a workpiece such as a sheet metal panel or plate which resides at a remote and hand inaccessible location.

The instant inventive grasping tool solves or ameliorates the drawbacks and deficiencies of common hand actuated grasping tools by providing specially configured nesting tubes or cylinders which are adapted for relative rotary motion via operation of a hand grip actuator mounted at a proximal end of the tool. Specially configured jaw structures presented at distal ends of the tubes or cylinders alternatively rotate and counter-rotate toward and away from each other in response to such relative rotary motions. The operation of the hand grip allows the tool to alternatively receive, clamp, and release such sheet metal panel workpiece.

BRIEF SUMMARY OF THE INVENTION

A first structural component of the instant inventive grasping tool comprises at least a first tube having a hollow bore, a proximal end, and a distal end. In a preferred embodiment, the at least first tube has a diameter between ⅞" and 1½", and has a length between three feet and four feet. The at least first tube may suitably be composed of steel, and suitably has a ten to twelve gauge wall thickness. For purposes of corrosion resistance, the at least first tube along with all other components described below may be composed of stainless steel.

A further structural component of the instant inventive grasping tool comprises a cylindrical member which is fitted for slidable and rotatable receipt within the hollow bore of the first tube. In a preferred embodiment the cylindrical member has a longitudinal length which is co-extensive with hollow bore of the first tube, the cylindrical member having matching proximal and distal ends. While the cylindrical member may suitably be configured as a solid cylinder, the cylindrical member preferably comprises a second tube which is configured similarly with the at least first tube to include a hollow bore and a tubular wall. The nesting receipt of the cylindrical member or second tube, as the case may be, within the first tube advantageously forms a quill and stem combination, such combination serving as the inventive tool's core or foundational structure.

A further structural component of the instant inventive grasping tool comprises at least a first pair of jaws. One of the jaws among the at least first pair of jaws is necessarily fixedly attached to or formed wholly with the distal end of the at least first tube. Where the cylindrical member is configured as a second tube, as is preferred, the other jaw among the at least first pair of jaws is necessarily fixedly attached to or formed wholly with the distal end of such second tube.

In operation of the instant inventive tool, and assuming that an article to be clamped and held has been received between the at least first pair of jaws, a rotation of the second tube within the first tube may engage said jaws with said article. Counter-rotation of the second tube releases the article.

Further preferred structural components of the instant inventive tool comprise a second pair of jaws which resides at the opposite sides of the first and second tubes relative to the first pair of jaws. The second pair of jaws is preferably configured similarly with the first pair of jaws, and in operation such second jaws are actuated simultaneously with the first pair of jaws. Where the article to be held by the tool is oblongated, such article may be simultaneously received between both the first and the second pairs of jaws. In operation of the preferred configuration of the instant inventive tool, the first and second pairs of jaws may be commonly actuated by a forceful rotation of the second tube, such actuation simultaneously clamping the oblongated article at two clamping sites.

While the scope of the instant invention encompasses variously configured jaws mounted to or formed at the distal ends of the first and second tubes, the article engaging and clamping surfaces of the first and second pairs of jaws may be beneficially formed or fabricated by impositions of slots within the walls of the first and second tubes at their distal ends. For example, the opposing jaws of the at least first pair of jaws may suitably comprise a pair of surfaces consisting of a counter-circumferential face or edge surface of a first slot which opens radially and distally at the distal end of the first tube and a circumferential face or edge surface of a second slot which similarly opens radially distally at the distal end of the second tube.

Further oppositely radial openings of the first and second slots at the opposite side of the tool may advantageously form a second pair of jaws which are capable of simultaneously receiving and further clamping the above described oblongated article.

In the preferred embodiment of the inventive tool, a hand grip actuatable trigger or lever is operatively mounted at the tool's proximal end. Such lever is preferably adapted for, upon squeezing of the hand grip and proximally flexing the lever, rotating the second tube within the first tube. Where first and second pairs of jaws are formed at the distal end of the tool via the above described provisions of first and second slots, such rotation of the second tube effects a misalignment of the second slot with respect to the first slot. Such slot misalignment may advantageously drive slot edges into clamping engagements with an oblongated article such as a sheet metal plate edge which is received between the slots' jaw functioning edges.

An opposite extension of the lever operatively counter-rotates the second tube to re-align the ends of the second slot which is formed at its distal end. Such slot realignment allows the first and second pairs of jaws to release such article.

Accordingly, objects of the instant invention include the provision of a tool for holding an article which incorporates structures as described above, and which arranges those structures in manners described above, for the performance of beneficial functions described above.

Other and further objects, benefits, and advantages of the instant invention will become known to those skilled in the art upon review of the Detailed Description which follows, and upon review of the appended drawings.

BRIEF DESCRIPTION OF THE DRAWINGS

FIG. 4 is an further alternative sectional view of the tool of FIG. 1, as indicated in FIG. 1.

FIG. 5 redepicts the structure of FIG. 4, the view of FIG. 5 showing a rotation of an internal cylindrical member toward an article clamping and holding position.

DETAILED DESCRIPTION OF A PREFERRED EMBODIMENT

Figure 1:
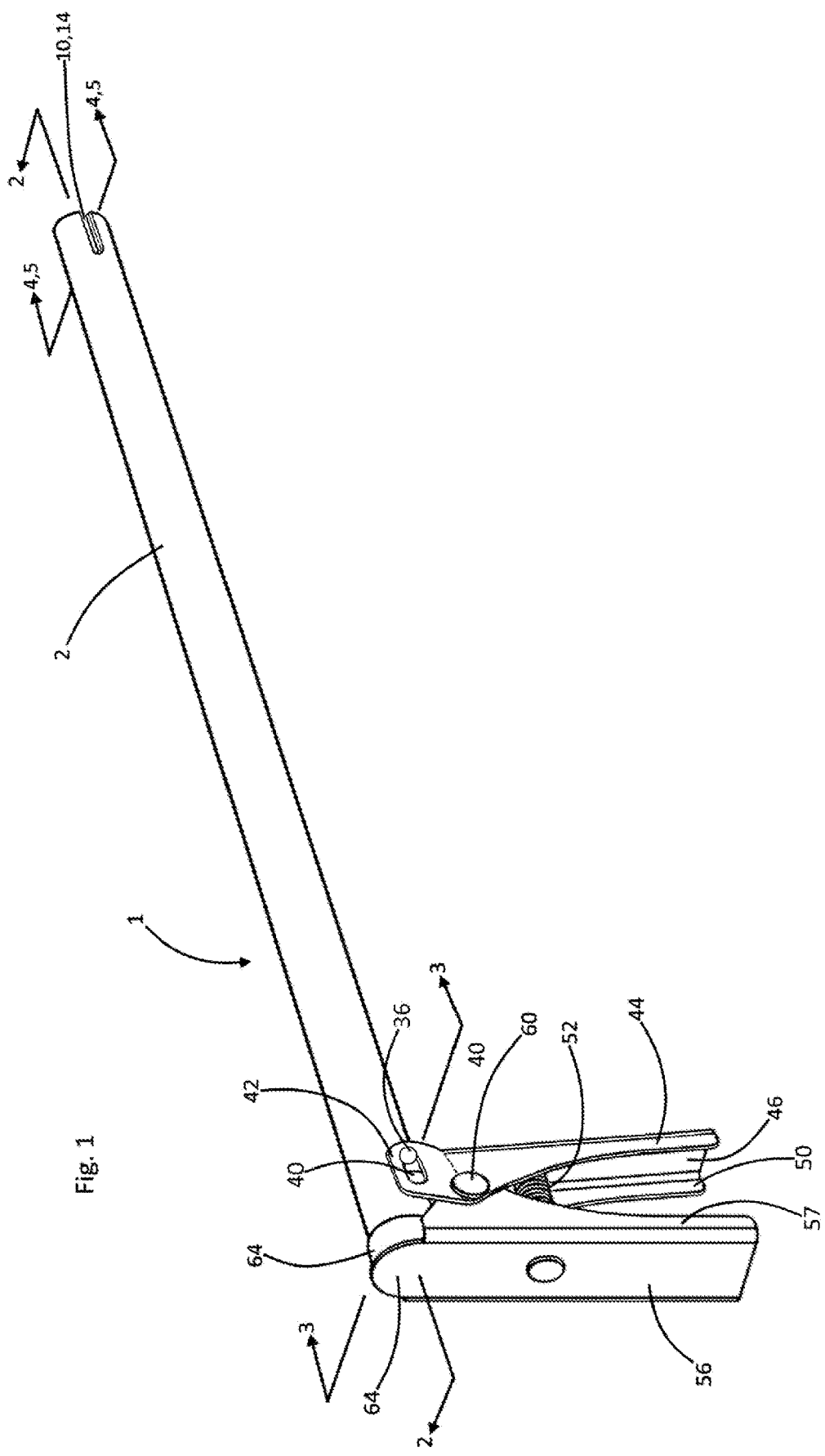
FIG. 1 is a perspective view of a preferred embodiment of the instant inventive tool.

Referring now to the drawings, and in particular to Drawing FIG. 1, a preferred embodiment of the instant inventive grasping tool is referred to generally by Reference Arrow 1. The grasping tool 1 comprises a first tube or outer tube 2, such tube having a distal article holding and clamping end which is pictured as extending away from the viewer of FIG. 1. The tool 1 has a hand grip actuator assembly operatively mounted at the tool's opposite proximal end. Referring further simultaneously to FIG. 4, a first distally opening slot 8 may be formed within the extreme distal end of the first tube 2. Slot 8, as depicted, further opens radially or leftwardly at the left side of the tool 1, such slot having a circumferentially facing slot edge or slot wall 18. The first slot 8 also presents an oppositely circumferentially facing slot edge or slot wall 16, such edge or wall 16 functioning as and constituting a clamping jaw. The first slot 8 preferably further extends oppositely radially or rightwardly across the tool's distal end to further open at and form a rightward opening component 10 of the first slot 8, such rightward opening 10 having a circumferentially facing wall 20 and an oppositely circumferentially facing wall 22. Similarly with the clamp jaw functioning oppositely circumferentially facing wall 16 of the first slot's leftward opening 8, the oppositely circumferentially facing wall 22 of the first slot's rightward opening 10 forms and may simultaneously function as a clamping jaw.

The left and right or radial and oppositely radial openings of the first tube's first slot 8,10 are preferably "U" shaped or configured, and the circumferential distances between their opposing circumferentially and oppositely circumferentially facing walls 18 and 16, and 20 and 22, are preferably sufficient to allow proximal and distal passages therebetween of an oblongated article to be held by the tool. For example, referring to FIGS. 4 and 5, an edge 32 of a conveyor pizza oven's finger duct plate may constitute such oblongated article which is sized for free passages into or out of the radial and oppositely radial openings of the first slot 8,10. In the preferred embodiment, the opposing radial and oppositely radial ends of the first slot 8,10 are positioned with respect to each other at opposite left and right sides of the first tube 2, the openings at such slot ends being spaced at approximate 180° circumferential intervals.

Figure 2:
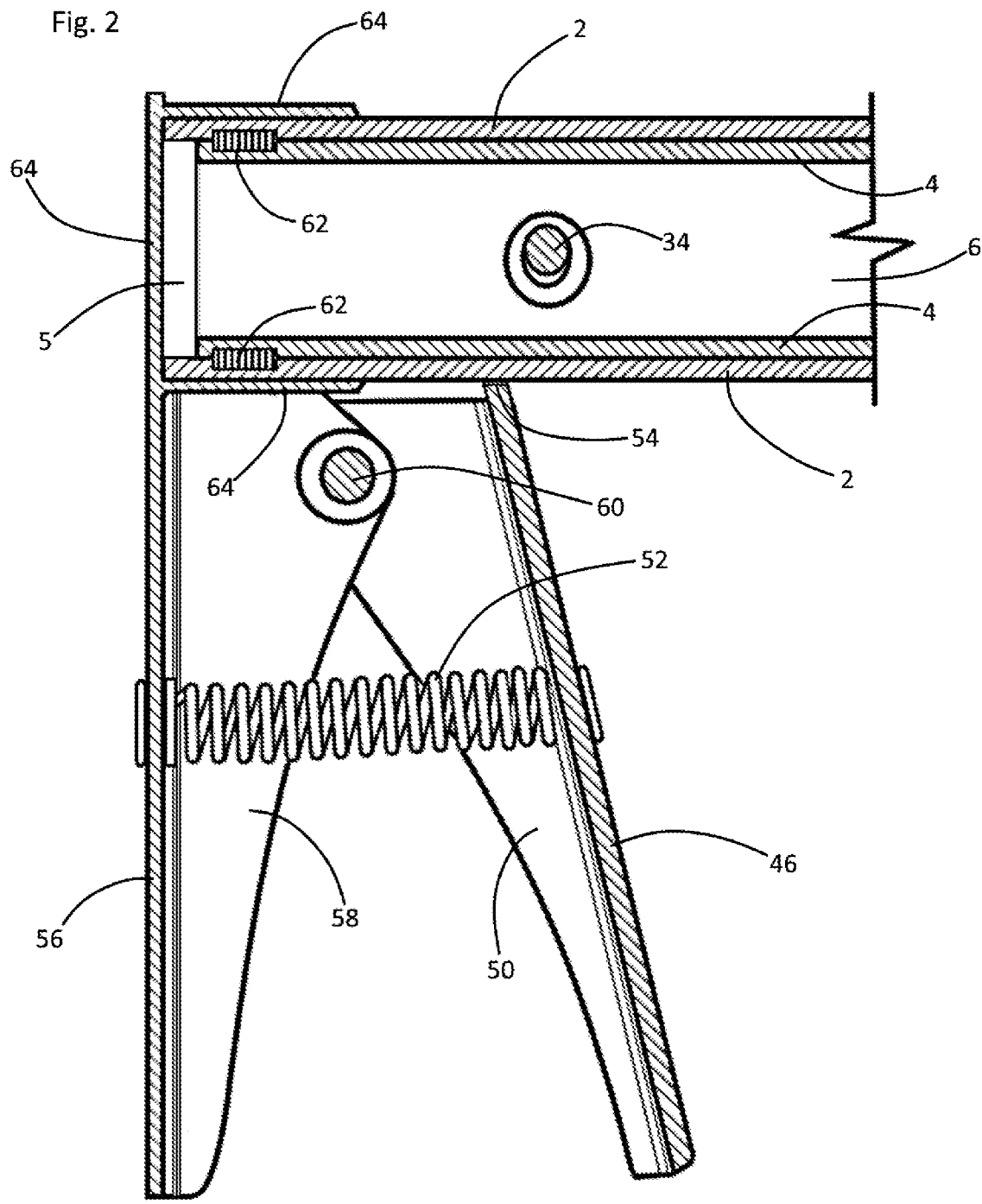
FIG. 2 is a partial sectional view of the tool of FIG. 1, as indicated in FIG. 1.

A further structural component of the instant inventive tool comprises a cylindrical member 4 which is rotatably mounted within, referring further to Drawing FIG. 2, the hollow bore 5 of the first tube 2. While the cylindrical member 4 may suitably comprise a solid cylinder, such member preferably comprises, as is depicted in Drawing FIGS. 2-5, a second tube having a hollow bore 6. The nesting receipt of such second tube configured cylindrical member 4 within the first tube 2 advantageously forms a quill and stem combination 2,4 which serves as a core or foundational structure of the tool.

A second slot 12 is suitably formed within the extreme distal end of the second tube 4, such second slot 12 opening distally and leftwardly or radially in correspondence with a radially overlying leftward opening of the first slot 8. Similarly with the first slot 8,10, the second slot 12 preferably extends rightwardly or oppositely radially across the distal end of the second tube 4 to further open at a rightward opening component 14 of the second slot 12. The tool's second slot formed at the distal end of the second tube 4 presents an oppositely circumferentially facing wall 24 and a clamp jaw functioning circumferentially facing wall 26. The rightward opening 14 of the second slot 12 at the opposite side of the second tube 4 correspondingly presents a clamp jaw functioning circumferentially facing wall 28, and an oppositely circumferentially facing wall 30. Jaws 16 and 26 are representative of the inventive tool's at least first pair of jaws, and jaws 22 and 28 which arise upon rightward or oppositely radial extensions of the first and second slots 8 and 12, are representative of the tool's preferably provided second pair of jaws. Differently configured jaws which may be fixedly attached to or formed wholly with the distal ends of the first and second tubes 2 and 4 are considered to fall within the scope of the invention.

In operation of the instant inventive tool 1, the cylindrical member or second tube 4 may be initially counter-rotated to an article passage position wherein the leftward opening of slot 12 oppositely radially underlies and substantially circumferentially aligns with the leftward opening of slot 8, as depicted in FIG. 4. Upon such circumferential alignment of slots 8 and 12, an article may pass proximally toward the tool to nestingly enter and reside between opposing jaws 16 and 26.

Thereafter, upon a slight circumferential rotation of the second tube 4 within and with respect to the first tube 2, the leftward opening of slot 12 circumferentially misaligns with the leftward opening of slot 8. Such slot misalignment causes the jaw functioning circumferential face 26 of the leftward opening of slot 12 to drive upwardly against a lower surface of such article, such driving action simultaneously driving an upper surface of such article upwardly against the oppositely circumferential clamp jaw functioning slot edge 16. Accordingly, application of such misaligning rotary force to the second tube 4 advantageously causes the tool's at least first pair of jaws 16 and 26 to clamp and hold such article. An opposite re-aligning counter-rotation of the second tube 4 causes such first pair of jaws to release such article.

Where the first and second slots 8 and 12 extend oppositely radially across and further open at the opposite or right side of the tool, the distal ends of tubes 2 and 4 form rightward slot openings 10 and 14, an oblongated article or workpiece, such as an edge of a panel or plate 32, may be received within the tool's first and second slots. At the tool's initial receipt of such panel, left and right extensions of the panel's edge may respectively protrude radially and oppositely radially from said slots' leftward and rightward openings 8,12 and 22,14. The preferably provided oppositely radial extensions of the first and second slots advantageously form slot edges 22 and 28 which function as a second pair of clamping jaws. Accordingly, upon a distally directed receipt of such oblongated workpiece 32 within such further extended first and second slots, the application of the above described circumferential misaligning force to the second tube 4 may advantageously simultaneously actuate the first and second pairs of clamping jaws 16,26 and 22,28. Such jaw actuation simultaneously engages and holds the oblongated article 32 at a pair of clamping sites along the edge of the article.

Figure 3:
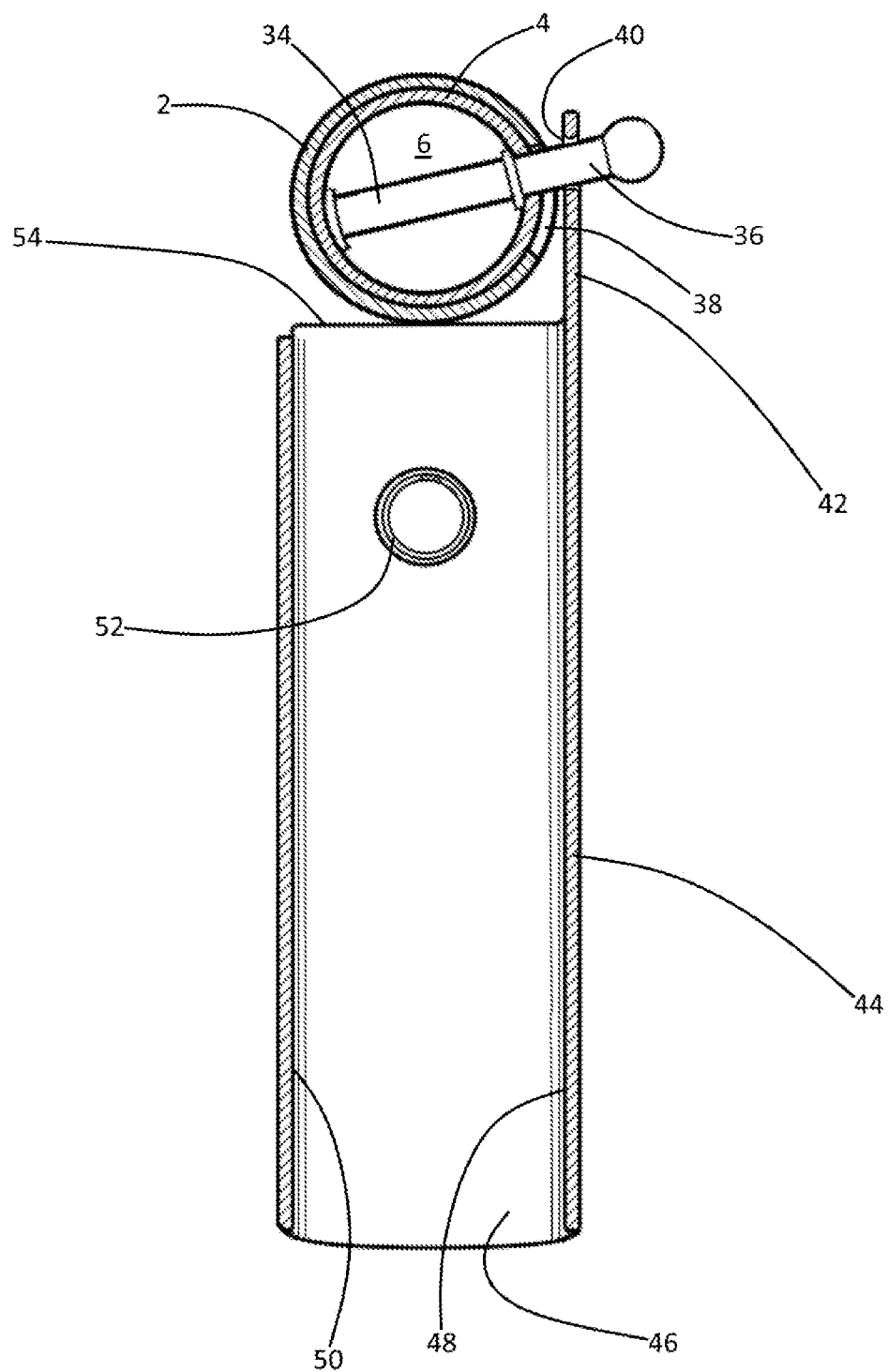
FIG. 3 is an alternative sectional view of the tool of FIG. 1, as indicated in FIG. 1.

Referring to FIGS. 1-3, rotary aligning and misaligning motions of the second tube 4 within the first tube 2, as discussed above, are preferably facilitated by a rotary bearing 62 which operatively interconnects the proximal ends of the first and second tube 2 and 4, such bearing preferably further functioning as an extraction stop which holds tube 4 in longitudinal alignment with tube 2.

Means for rotating the second tube 4 within the first tube 2 are necessarily provided, such means suitably providing a swivel arm 34 which includes a radial extension 36. The swivel arm 34 is fixedly attached to the second tube 4 at its proximal end, and in the preferred embodiment, the radial extension 36 of such arm serves as a tube rotating lever arm.

In order to allow circumferentially directed forces applied to the radial extension 36 to freely rotate the second tube 4 within the first tube 2, a rotary travel slot 38 is preferably formed within the wall of the first tube 2, such slot allowing the radial extension 36 to extend radially outwardly therefrom and to travel circumferentially therealong. The above described clamping action of slot edge jaws 16,26 and 22,28 may be suitably actuated by applications of circumferentially directed and counter-circumferentially directed pulling and driving forces to the radial extension portion 36 of the swivel arm 34.

Such swivel arm turning, pulling, and driving forces are suitably actuated by a lever arm 46 and levered arm 42 combination, such arms suitably being formed wholly with each other at a joint designated by the dashed line drawn in FIG. 1 at the upper end of the lever arm 46. A fulcrum pin or pivot pin 60 preferably pivotally supports the lever arm 46 and levered arm 42 combination immediately distally from a handle 56. Clevis ear flanges 57 and 58 which extend distally from the right and left sides of the handle 56 engage lever arm flanges 44 and 50 in the manner of a pin, eye, and clevis joint. Flanges 44 and 50 which extend proximally from the right and left sides of the lever arm 46 correspond with and nestingly receive handle flanges 57 and 58. Accordingly, the handle 56 and the lever arm 46 suitably comprise nesting "C" channels which are interconnected by the laterally spanning pivot pin 60 to form the depicted scissor arm actuator assembly.

The upper end of the handle 56 preferably presents a distally opening mounting socket 64 which nestingly receives and supports the proximal end of the outer tube 2. Correspondingly, the levered arm 42 presents a swivel arm carrying slot 40 through which the radial extension 36 of the swivel arm 34 extends. Upon flexion or rearward retraction of the lever arm 46, the upper edge of slot 40 draws and pulls downwardly against extension 36, rotating the second tube 4 within the bore 5 of the first tube 2. Upon an opposite pivoting or extending motion of the lever arm 46, the lower edge of the swivel arm carrying slot 40 drives upwardly against extension 36 to counter-rotate the second tube 4. Accordingly, the above described article clamping and releasing actions performed by the first and second pairs of clamp jaws 16,26 and 22,28 are effectively simultaneously actuated by such flexing and extending motions of the lever arm 46.

Referring to FIG. 2, a spring 52 preferably spans between the handle 56 and the lever arm 46, such spring normally driving and extending the lever arm 46 distally. An extreme upper end or edge 54 of the lever arm 46 may advantageously function as a pivot stop, such edge 54 preferably being positioned to resist any spring induced hyper-extending motion of the lever arm 46. When the pivot stop 54 contacts the lower surface of the first tube 2, the lower edge of the swivel arm carrying slot 40 preferably counter-rotates the second tube 4 toward the aligned and open jaw article passage position depicted in FIG. 4. Proximally directed pressure applied by the fingers of an operator's hand while holding the handle 56 advantageously causes the left and right openings 12 and 14 of the second slot to misalign with the left and right openings 8 and 10 of the first slot. Such finger grip actuated slot misalignments cause the tool's clamping jaws 16,26 and 22,18 to simultaneously securely hold article 32 at the pair of clamping sites. Upon distally relaxing such finger pressure, the lever arm 46 may distally extend in response to the normal bias of the spring 52. Accordingly, the tool's dual clamping engagements with the article 32 automatically release upon a release of the operator's finger grip pressure against lever 46.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A tool for holding an article, the tool comprising:
(a) a first tube having a proximal end and a distal end;
(b) a cylindrical member received within the first tube, the cylindrical member having a proximal end and a distal end; and
(c) a first pair of jaws, wherein one of the jaws among the first pair of jaws is fixedly attached to or formed wholly with the distal end of the first tube, wherein the other jaw among the first pair of jaws is fixedly attached to or formed wholly with the distal end of the cylindrical member, wherein the cylindrical member comprises a second tube, wherein said tool comprises a first slot opening at the distal end of the first tube, wherein said tool comprises a second slot opening at the distal end of the second tube, wherein the one of the jaws among the first pair of jaws comprises an edge of the first slot, and wherein the other jaw among the first pair of jaws comprises an edge of the second slot.

2. The tool of claim 1 further comprising a second pair of jaws, wherein a first jaw among the second pair of jaws is fixedly attached to or formed wholly with the distal end of the first tube, and wherein the other jaw among the second pair of jaws is fixedly attached to or formed wholly with the distal end of the cylindrical member.

3. A tool for holding an article, the tool comprising:
(a) a first tube having a proximal end and a distal end;
(b) a second tube received within the first tube, the second tube having a proximal end and a distal end;
(c) a first pair of jaws, wherein one of the jaws among the first pair of jaws is fixedly attached to or formed wholly with the distal end of the first tube, and wherein the other jaw among the first pair of jaws is fixedly attached to or formed wholly with the distal end of the second tube;
(d) a second pair of jaws, wherein a first jaw among the second pair of jaws is fixedly attached to or formed wholly with the distal end of the first tube, and wherein the other jaw among the second pair of jaws is fixedly attached to or formed wholly with the distal end of the second tube;

(e) a first distally opening slot, said slot further opening at opposite sides of the first tube; and (f) second distally opening slot, said slot further opening at opposite sides of the second tube, wherein the one of the jaws among the first pair of jaws comprises an edge of the first distally opening slot, wherein the other jaw among the first pair of jaws comprises an edge of the second distally opening slot, wherein one of the jaws among the second pair of jaws comprises another edge of the first distally opening slot, and wherein the other jaw among the second pair of jaws comprises another edge of the second distally opening slot.

4. The tool of claim 3 wherein, upon a receipt of the article between the first and second pairs of jaws, a rotation of the second tube within the first tube may misalign the first and second distally opening slots and may engage the first and second pairs of jaws with the article, and wherein, upon said article engagement, a counter-rotation of the second tube within the first tube may disengage said jaws from the article.

5. The tool of claim 4 comprising a handle having an upper end fixedly attached to the proximal end of the first tube.

6. The tool of claim 5 comprising a rotary travel slot within the first tube, the rotary travel slot being positioned at the first tube's proximal end, and comprising a swivel arm fixedly attached to the second tube, the swivel arm extending through the rotary travel slot.

7. The tool of claim 6 comprising a lever arm and a levered arm, the levered arm being fixedly attached to or formed wholly with an upper end of the lever arm.

8. The tool of claim 7 wherein the levered arm is connected operatively to the swivel arm for, upon an actuation of the lever arm, moving the swivel arm along the rotary travel slot, and wherein the swivel arm rotates or counter-rotates the second tube upon such motion.

9. The tool of claim 8 further comprising a pivot mount interconnecting the handle and the lever arm.

10. The tool of claim 9 wherein the pivot mount comprises a pivot pin and aligned eyes combination.

11. The tool of claim 10 wherein the lever arm is adapted for alternatively pivoting toward a flexed position and toward an extended position, wherein the lever arm, upon pivoting toward the flexed position, rotates the swivel arm, and wherein the lever arm, upon pivoting toward the extended position, counter-rotates the swivel arm.

12. The tool of claim 11 further comprising a spring connected operatively to the handle, the spring being adapted to normally move the lever arm toward the extended position.

13. The tool of claim 12 wherein the handle and the lever arm comprise a pair of "C" channel members.

\* \* \* \* \*